(12) United States Patent (10) Patent No.: US 12,686,441 B1

Lee et al. (45) Date of Patent: Jul. 21, 2026

(54) REAR SUBFRAME FOR VEHICLE

(71) Applicants:Hyundai Motor Company, Seoul (KR); Kia Corporation, Seoul (KR)

(72) Inventors: Won Hae Lee, Seoul (KR); Byung Joo Chung, Gunpo-si (KR); Jung Ju Kim, Hwaseong-si (KR); Seung Hak Lee, Asan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/281,009

(22) Filed: Jul. 25, 2025

(30) Foreign Application Priority Data

Mar. 11, 2025    (KR) ........................ 10-2025-0031644

(51) Int. Cl.
| | |
|---|---|
| *B62D 21/02* | (2006.01) |
| *B60K 17/24* | (2006.01) |
| *B62D 21/11* | (2006.01) |
| *B62D 21/15* | (2006.01) |

(52) U.S. Cl.
CPC ............ *B62D 21/155* (2013.01); *B60K 17/24* (2013.01); *B62D 21/02* (2013.01); *B62D 21/11* (2013.01)

(58) Field of Classification Search
CPC ................................ B62D 21/11; B62D 21/02
See application file for complete search history.

(56) References Cited

U.S. PATENT DOCUMENTS

| | | | | |
|---|---|---|---|---|
| 9,950,743 | B2 * | 4/2018 | Yokota .................. | B62D 21/08 |
| 2018/0281860 | A1 * | 10/2018 | Tanaka .................. | B60G 3/20 |
| 2019/0061821 | A1 * | 2/2019 | Tanaka .................. | B62D 21/11 |

FOREIGN PATENT DOCUMENTS

| | | | | | |
|---|---|---|---|---|---|
| CN | 208198581 | U | * | 12/2018 | |
| CN | 210235097 | U | * | 4/2020 | |
| CN | 111301524 | A | * | 6/2020 | ............ B62D 21/11 |
| CN | 111301524 | B | * | 3/2022 | ............ B62D 21/11 |
| CN | 114275042 | A | * | 4/2022 | |
| CN | 115352526 | A | * | 11/2022 | ........ B60R 16/0215 |
| CN | 116812007 | A | * | 9/2023 | .......... B62D 29/008 |
| CN | 116985910 | A | * | 11/2023 | ............ B62D 21/02 |
| CN | 221114077 | U | * | 6/2024 | ............ B62D 21/02 |
| CN | 118457726 | A | * | 8/2024 | ............ B62D 21/11 |
| CN | 118457730 | A | * | 8/2024 | ............ B62D 21/02 |
| CN | 116161119 | B | * | 11/2024 | .......... B62D 21/152 |
| CN | 120057112 | A | * | 5/2025 | ............ B60K 1/00 |
| CN | 120534431 | A | * | 8/2025 | ............ B60K 1/00 |
| DE | 102017006826 | A1 | * | 3/2018 | ............ B62D 21/11 |
| DE | 102017006825 | A1 | * | 10/2018 | ............ B62D 21/11 |
| DE | 102019214369 | A1 | * | 4/2020 | ............ B60R 19/34 |
| DE | 102019214370 | A1 | * | 4/2020 | ............ B62D 25/08 |
| DE | 102021116305 | A1 | * | 12/2022 | ............ B62D 21/11 |
| EP | 3297891 | B1 | * | 5/2019 | ............ B60K 1/00 |

(Continued)

*Primary Examiner* — Nicole T Verley

(74) *Attorney, Agent, or Firm* — Slater Matsil, LLP

(57) ABSTRACT

In an embodiment a subframe includes a front cross member extending in a lateral direction of a vehicle body; two side members symmetrically connected to both rear sides of the front cross member and extending in a longitudinal direction of the vehicle body and a rear cross member spaced rearward from the front cross member, extending in the lateral direction of the vehicle body, and connecting the two side members, wherein each of the two side members comprises a through-hole through which a drive shaft is disposable.

20 Claims, 15 Drawing Sheets

(56)                  References Cited

FOREIGN PATENT DOCUMENTS

| JP | 6269638 | B2 | * | 1/2018 | ............. B62D 21/03 |
| JP | 2024169255 | A | * | 12/2024 | |
| JP | 7660810 | B2 | * | 4/2025 | |
| KR | 101126237 | B1 | * | 3/2012 | |
| KR | 20190142665 | A | * | 12/2019 | ............. B62D 21/08 |
| KR | 20200138503 | A | * | 12/2020 | ........... B62D 21/155 |
| KR | 20240084565 | A | * | 6/2024 | ............. B62D 21/11 |
| KR | 20250128411 | A | * | 8/2025 | ............. B21C 23/01 |
| WO | WO-2017082151 | A1 | * | 5/2017 | ............. B62D 21/11 |
| WO | WO-2020059669 | A1 | * | 3/2020 | ............. B60R 19/24 |
| WO | WO-2020065864 | A1 | * | 4/2020 | ............. B60K 1/04 |
| WO | WO-2022151028 | A1 | * | 7/2022 | ............. B62D 21/02 |

* cited by examiner

Front CT

REAR SUBFRAME FOR VEHICLE

CROSS-REFERENCE TO RELATED APPLICATIONS

This application is based on and claims priority under 35 U.S.C. 119 to Korean Patent Application No. 10-2025-0031644, filed on Mar. 11, 2025, in the Korean Intellectual Property Office, the disclosure of which is herein incorporated by reference in its entirety.

TECHNICAL FIELD

The present disclosure relates to a rear subframe structure for a vehicle.

BACKGROUND

Recently, an increasing number of vehicle models are configured to directly drive the rear wheels by arranging a rear wheel motor at the rear of the vehicle body.

In addition, in order to enhance the output of the rear wheel motor, there is a tendency to increase the size of the motor. However, in this case, a problem arises in satisfying the minimum ground clearance of the vehicle. To address this issue, the rear wheel motor may be disposed higher relative to the vehicle body.

However, when the rear wheel motor is disposed higher than in conventional configurations, the rear subframe, which supports the rear wheel motor, may interfere with the drive shaft that connects the rear wheel motor and the wheels. To address this issue, the rear subframe may be partially formed in a curved shape to avoid interference with the drive shaft.

However, when the rear subframe is partially formed in a curved shape to avoid interference with the drive shaft as described above, the rigidity of the rear subframe may be weakened.

The foregoing described as the background art is intended merely to aid in the understanding of the background of the present disclosure, and is not intended to mean that the present disclosure falls within the purview of the related art already known to those skilled in the art.

SUMMARY

Embodiments provide a rear subframe for a vehicle that sufficiently ensures the minimum ground clearance, avoids interference with a drive shaft, and firmly and stably supports a rear wheel motor and related components while ensuring sufficient rigidity against impacts and vibrations to satisfy the vehicle's noise, vibration, and harshness (NVH) characteristics and crash safety requirements.

The embodiments pursued in the present disclosure may not be limited to the above-mentioned embodiments, and other technical embodiments, which are not mentioned, may be clearly understood from the following descriptions by those skilled in the art to which the present disclosure pertains.

In view of the foregoing, a rear subframe for a vehicle according to the present disclosure includes: a front cross member extending in a lateral direction of a vehicle body; two side members that are symmetrically connected to rear sides of both ends of the front cross member and extend in a longitudinal direction of the vehicle body; and a rear cross member spaced rearward from the front cross member and extending in the lateral direction of the vehicle body so as to connect the two side members.

Each of the two side members includes a through-hole through which a drive shaft is disposed.

The front cross member may include a front mounting bush at each of both end portions thereof, and each of the two side members may include a rear mounting bush at the rear end portion thereof.

Both end portions of the front cross member, each of which includes the front mounting bush, and the rear end portions of the two side members, each of which includes the rear mounting bush, are each formed in a shape extending in a diagonal direction of a rectangular shape formed by the front cross member, the two side members, and the rear cross member.

The two side members may be coupled to a rear side of the front cross member while continuously surrounding around an upper surface, a rear surface, and a lower surface of the front cross member.

Each of the two side members may include: a hole cylinder that surrounds the through-hole; a side upper member that is coupled while surrounding an upper side of the hole cylinder and continuously connects the front cross member and the rear mounting bush; a side front member that connects a front side of the hole cylinder and the front cross member and is coupled to a lower side of the side upper member; a side rear member that connects a rear side of the hole cylinder and the rear mounting bush and is coupled to the lower side of the side upper member; and a side lower member that surrounds a lower side of the hole cylinder and connects the side front member and the side rear member.

The side upper member, the side front member, and the side lower member may form a structure in which multiple closed cross-sections overlap each other on the front side of the hole cylinder.

Each end of the rear cross member may be coupled while continuously surrounding an upper surface of the side upper member, and surfaces of the side upper member and the side rear member located inside the vehicle body, and a lower surface of the side rear member.

A lower arm bracket configured to rotatably support a lower arm, which extends in the lateral direction of the vehicle body, may be integrally connected to the lower side of the rear cross member.

The rear subframe may further include a side lower reinforcement member that connects and supports the lower arm bracket and the side lower member in a front-rear direction of the vehicle body.

A rear auxiliary arm bracket may be provided behind the rear cross member to connect and support the side member and the rear cross member and to rotatably support a rear auxiliary arm, which extends in the lateral direction of the vehicle body, at a position above and behind the lower arm.

A front upper bracket configured to rotatably support the front upper arm may be provided above the connection between the front cross member and each of the side members to be supported by both the front cross member and the side member.

The through-hole of each of the two side members may be surrounded by an arc-shaped member having a cross-sectional shape in which a portion of a circle is cut out.

The through-hole of each of the two side members may be surrounded by a plurality of arc-shaped members arranged along a circumferential direction of the through-hole.

The through-hole of each of the two side members may be surrounded by at least one arc-shaped member arranged along a circumferential direction of the through-hole.

Each of the two side members may include: a side upper member that is coupled while surrounding an upper side of the through-hole surrounded by the arc-shaped member and continuously connects the front cross member and the rear mounting bush; a side front member that connects a front side of the through-hole surrounded by the arc-shaped member and the front cross member and is coupled to a lower side of the side upper member; a side rear member that connects a rear side of the through-hole surrounded by the arc-shaped member and the rear mounting bush and is coupled to the lower side of the side upper member; and a side lower member that surrounds a lower side of the through-hole surrounded by the arc-shaped member and connects the side front member and the side rear member.

The side upper member, the side front member, and the side lower member may form a structure in which multiple closed cross-sections overlap each other on the front side of the through-hole surrounded by the arc-shaped member.

Each end of the rear cross member may be coupled while continuously surrounding an upper surface of the side upper member, and surfaces of the side upper member and the side rear member located inside the vehicle body, and a lower surface of the side rear member.

A lower arm bracket configured to rotatably support a lower arm, which extends in the lateral direction of the vehicle body, may be integrally connected to the lower side of the rear cross member.

The rear subframe may further include a side lower reinforcement member that connects and supports the lower arm bracket and the side lower member in a front-rear direction of the vehicle body.

The present disclosure sufficiently ensures the minimum ground clearance of a vehicle, avoids interference with a drive shaft, and firmly and stably supports a rear wheel motor and related components while ensuring sufficient rigidity against impacts and vibrations to satisfy the vehicle's noise, vibration, and harshness (NVH) characteristics and crash safety requirements.

Advantageous effects obtainable from the present disclosure may not be limited to the above-mentioned effects, and other effects which are not mentioned may be clearly understood from the following descriptions by those skilled in the art to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
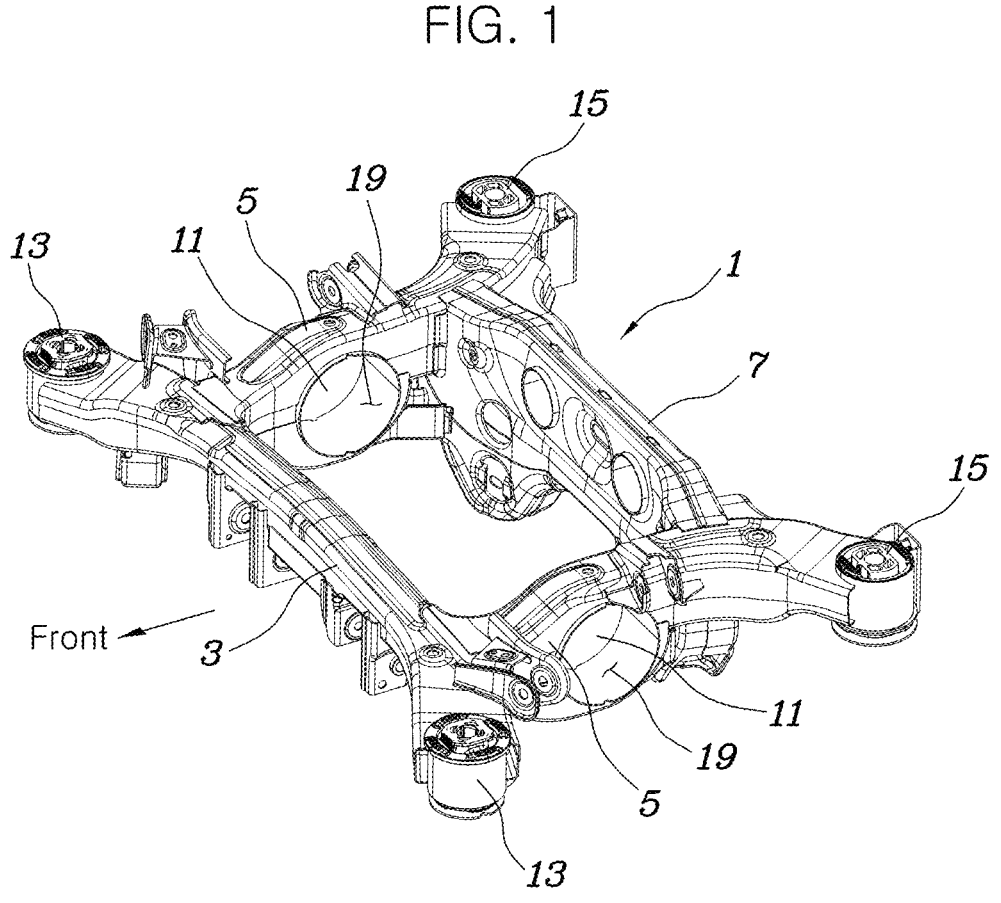
FIG. 1 is a view exemplifying a rear subframe for a vehicle according to the present disclosure.
Figure 2:
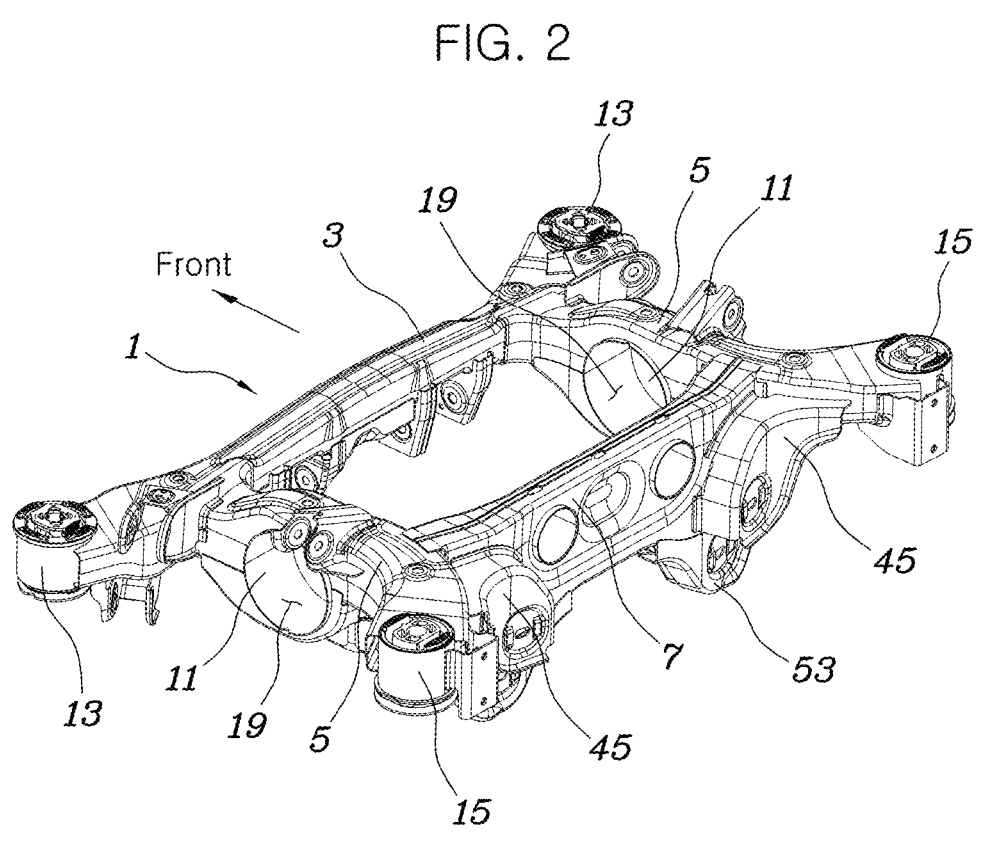
FIG. 2 is a view illustrating the rear subframe of FIG. 1 as observed from a rear side.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for the purpose of distinguishing one element from other elements.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms "module" and "unit" used for the elements in the following description are given or interchangeably used in consideration of only the ease of writing the specification, and do not have distinct meanings or roles by themselves.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

Any number of components or a variety of components in any of the configurations described herein may be included in the disclosure described herein. The components may include any combination of the features described herein and may be arranged in any of the various configurations described herein. The concepts relating to the structure and arrangement of the components of the present disclosure, as well as their use and operation, may be applied to any number of embodiments in any combination, as well as to the specific embodiments discussed herein. Embodiments including those having various features in various arrangements are described below with reference to the drawings.

Hereinafter, embodiments set forth herein will be described in detail with reference to the accompanying drawings, and the same or similar elements are given the same and similar reference numerals regardless of figure numbers, so duplicate descriptions thereof will be omitted.

Referring to FIGS. 1 to 13, an embodiment of the rear subframe 1 of a vehicle according to the present disclosure includes: a front cross member 3, which extends in the lateral direction of the vehicle body; two side members 5, which are symmetrically connected to both rear sides of the front cross member 3 and extend in the longitudinal direction of the vehicle body; and a rear cross member 7, which is spaced rearward from the front cross member 3 and extends in the lateral direction of the vehicle body to connect the two side members 5.

Here, the two side members 5 include through-holes 11, respectively, such that a drive shaft 9 can be disposed therethrough, and the front cross member 3 includes front mounting bushes 13 at both end portions thereof. In addition, the two side members 5 include rear mounting bushes 15 at the rear end portions thereof, respectively.

That is, the rear subframe 1 of the present disclosure is mounted to a vehicle body via the front mounting bushes 13 and the rear mounting bushes 15, and supports a rear wheel motor 17 installed therein. The drive shaft 9 connected to the rear wheel motor 17 is configured to be connected to the rear wheels through the through-holes 11 of the side members 5.

Accordingly, by appropriately positioning the rear wheel motor 17, the minimum ground clearance of the vehicle may be sufficiently secured while preventing interference between the drive shaft 9 and the rear subframe 1. In addition, by configuring the rear subframe 1 to ensure sufficient rigidity considering that the drive shaft 9 is disposed therethrough, the rear subframe firmly and stably supports the rear wheel motor 17 and its associated components and provides sufficient rigidity against, for example, impacts and vibrations, thereby satisfying the vehicle's NVH characteristics and crash safety requirements.

Figure 3:
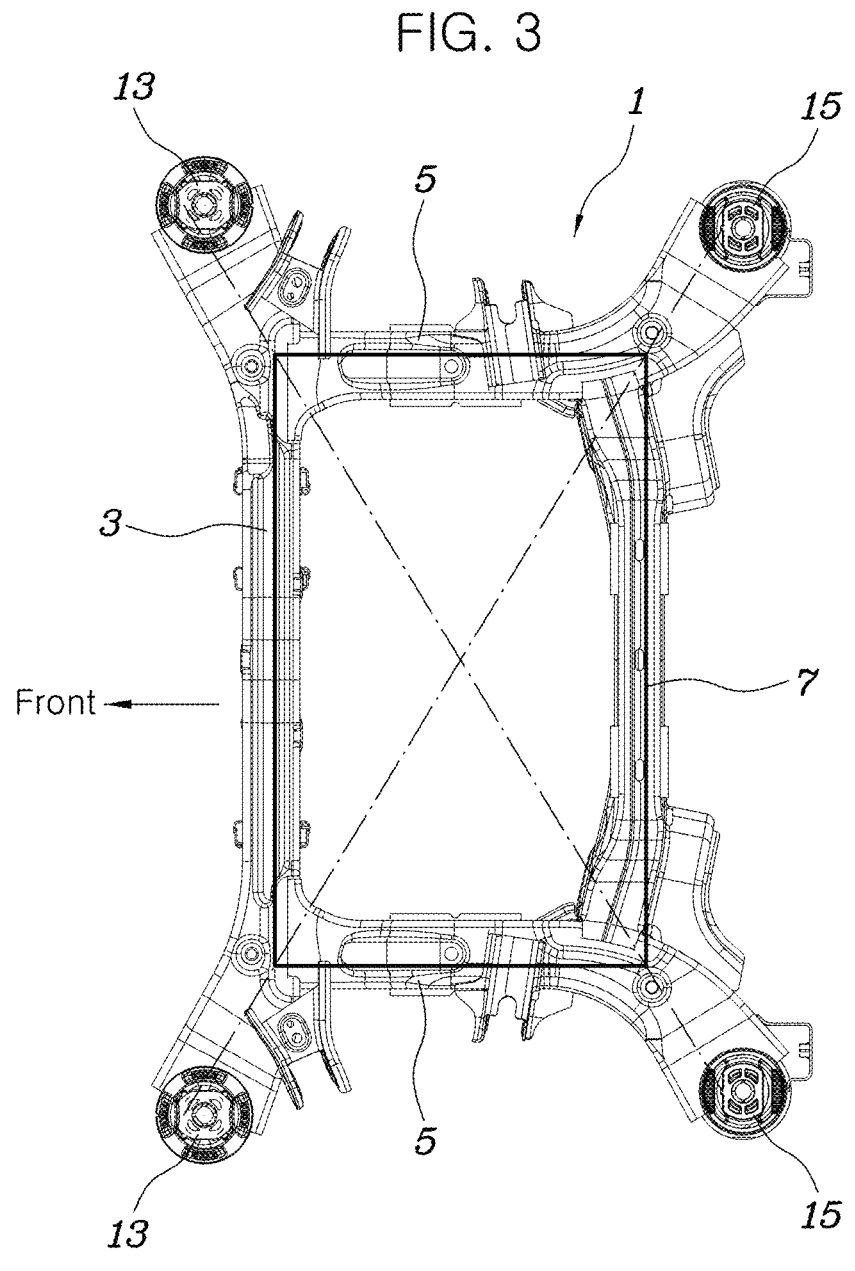
FIG. 3 is a plan view of the rear subframe of FIG. 1.

As illustrated in FIG. 3, both end portions of the front cross member 3, which includes the front mounting bushes 13, and the rear end portions of the two side members 5, each of which includes the rear mounting bush 15, are each formed in a shape extending in a diagonal direction of a rectangular shape formed by the front cross member 3, the two side members 5, and the rear cross member 7.

Accordingly, by configuring a structure in which a rigid rectangular support structure defined by the front cross member 3, the two side members 5, and the rear cross member 7 is being centered and three arms are connected at each corner of the rectangular shape while forming an angle of 90° or more with one another, impact or load applied to the rear subframe 1 may be effectively dispersed and supported.

The two side members 5 are coupled to the rear side of the front cross member 3 while continuously surrounding the upper surface, rear surface, and lower surface of the front cross member 3.

Figure 4:
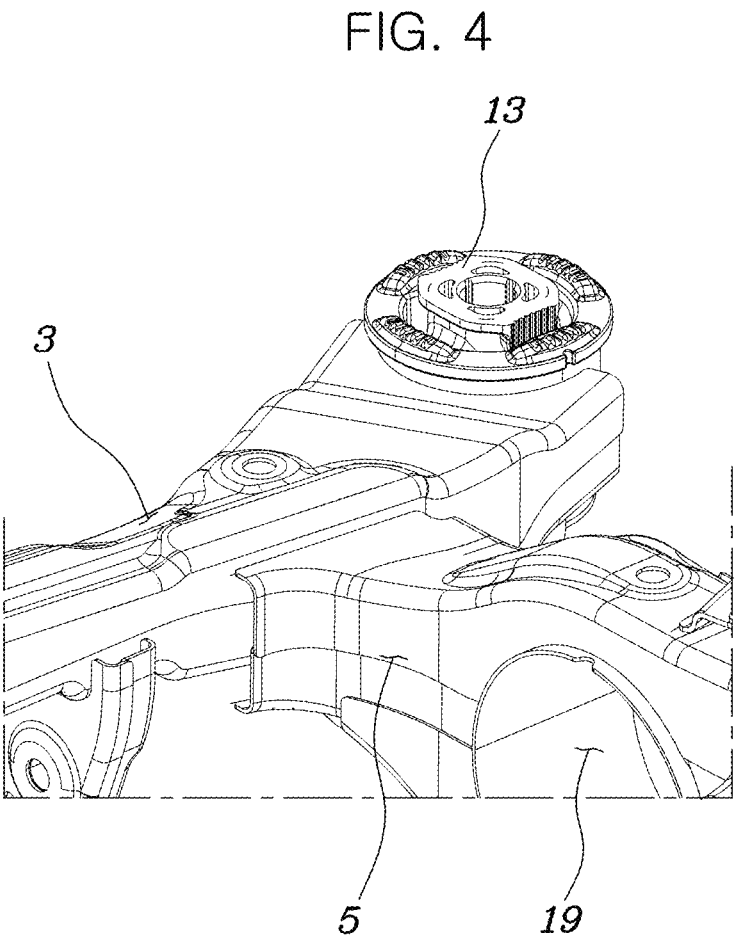
FIG. 4 is a view illustrating a coupling structure between a front cross member and a side member of the rear subframe.
Figure 5:
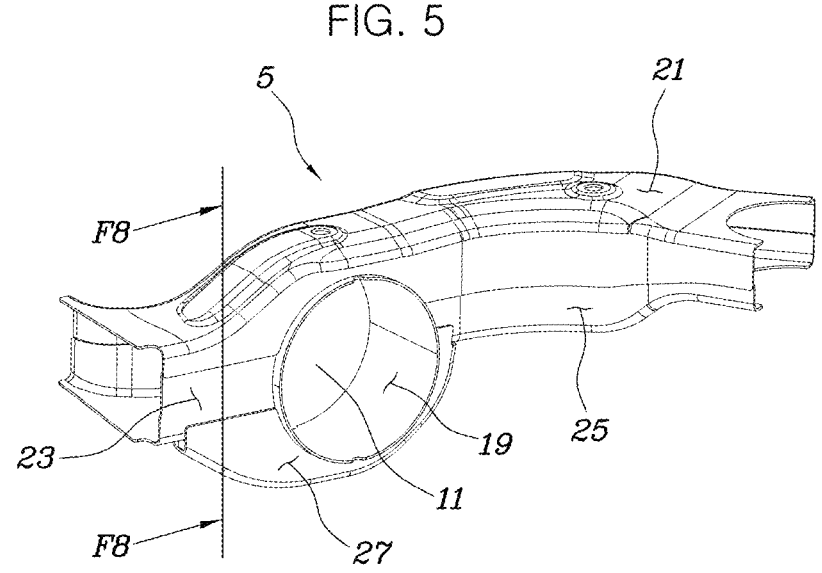
FIG. 5 is a detailed view illustrating the side member.
Figure 6:
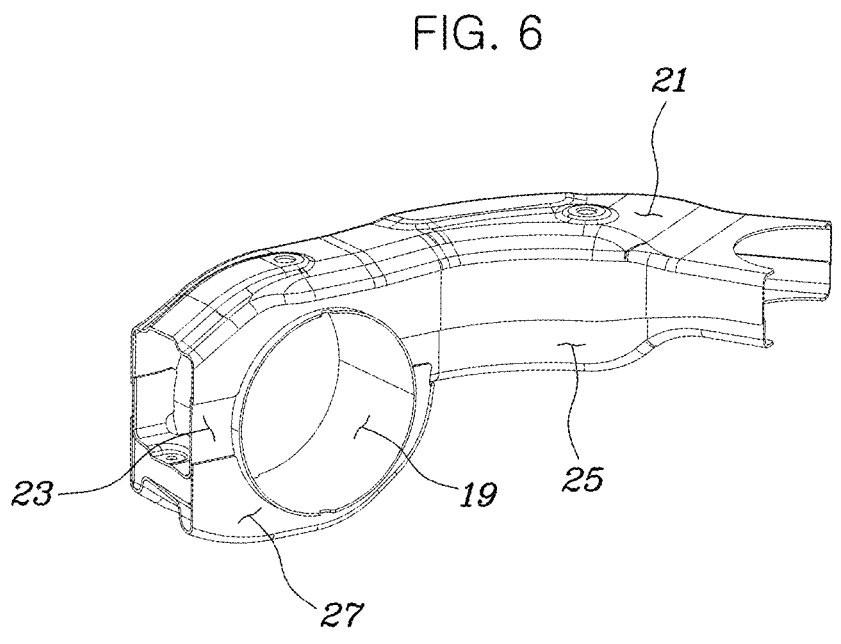
FIGS. 6 and 7 are exploded views illustrating the side member of FIG. 5.
Figure 7:
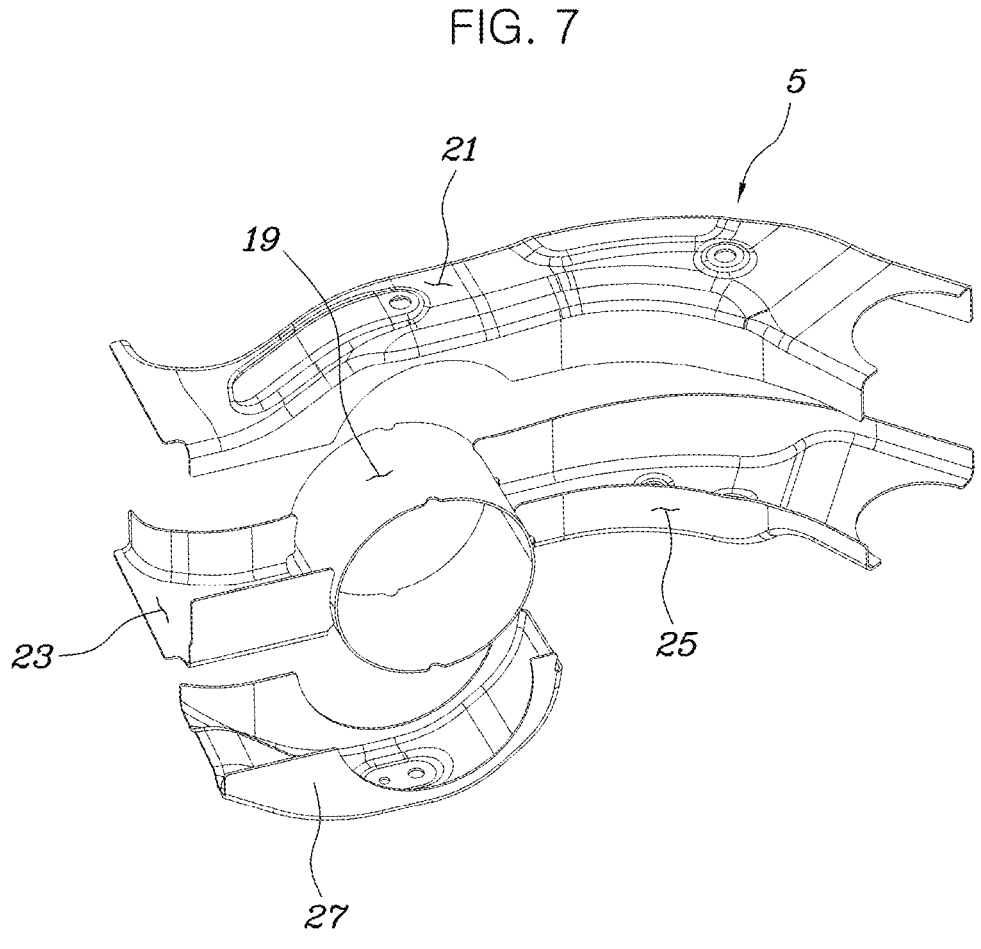

FIG. 4 illustrates the front cross member 3 and a side member 5 in a slightly separated state to describe the coupling structure between the front cross member 3 and the side member 5. The front end portion of each side member 5 is formed in a U-shape to be coupled to the front cross member 3 through, for example, welding, while continuously surrounding all of the upper surface, rear surface, and lower surface of the front cross member 3.

Accordingly, compared to a simple butt coupling between the front cross member 3 and the side members 5, a more rigid coupling structure is formed without the need for additional reinforcement components.

Each of the two side members 5 includes: a hole cylinder 19 that surrounds a through-hole 11; a side upper member 21 that is coupled while surrounding an upper side of the hole cylinder 19 and continuously connects the front cross member 3 and the rear mounting bush 15; a side front member 23 that connects the front side of the hole cylinder 19 and the front cross member 3 and is coupled to a lower side of the side upper member 21; a side rear member 25 that connects the rear side of the hole cylinder 19 and the rear mounting bush 15 and is coupled to the lower side of the side upper member 21; and a side lower member 27 that surrounds a lower side of the hole cylinder 19 and connects the side front member 23 and the side rear member 25.

That is, the through-hole 11 through which the drive shaft 9 passes is defined by the hole cylinder 19. The side upper member 21 is continuously connected to the upper side of the hole cylinder 19 from the front side to the rear side of the hole cylinder 19, thereby ensuring basic rigidity in the front-rear direction. The front side of the hole cylinder 19 is connected to the front cross member 3 by the side front member 23 while forming a closed cross-section together with the side upper member 21. The rear side of the hole cylinder 19 is connected to the rear mounting bush 15 by the side rear member 25 while forming a closed cross-section together with the side upper member 21.

Figure 8:
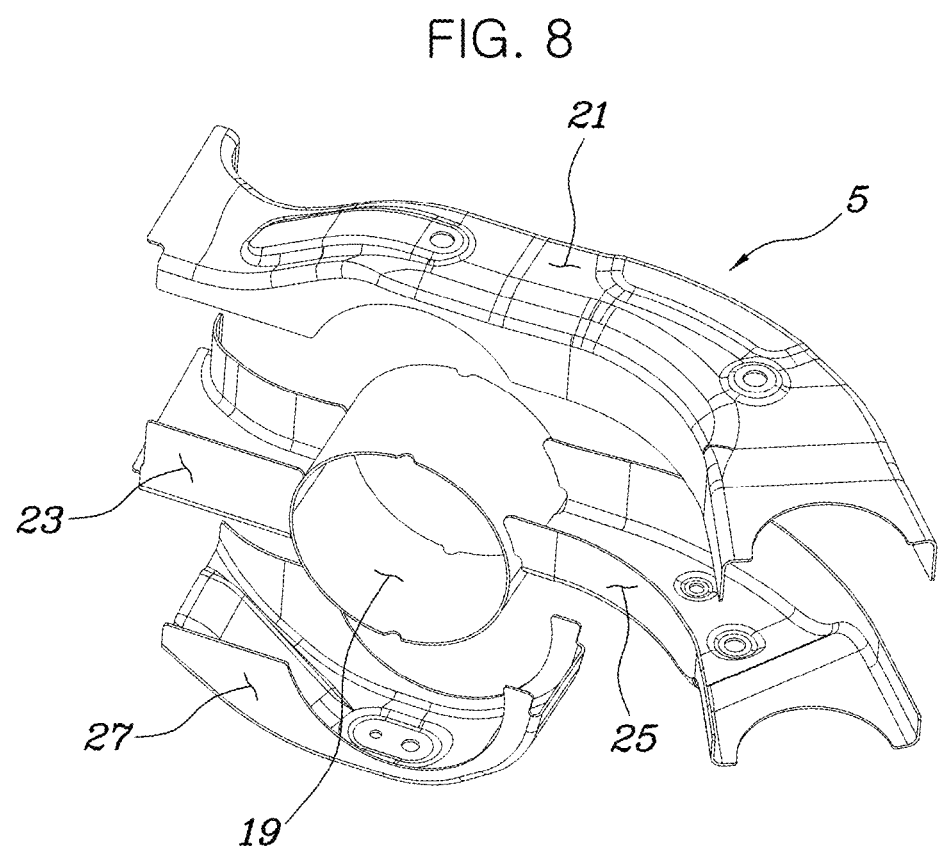
FIG. 8 is a cross-sectional view taken along line F8-F8 of FIG. 5.
Figure 9:
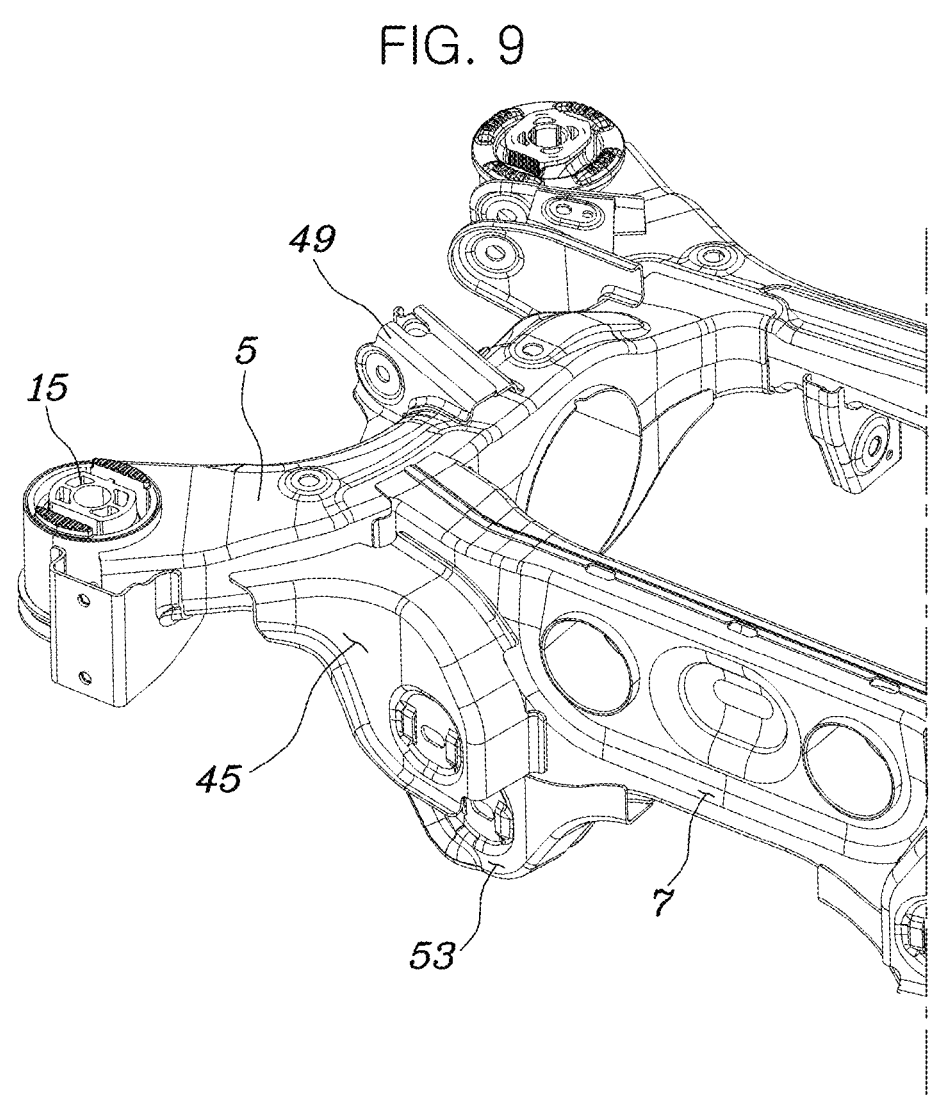
FIG. 9 is a view illustrating the rear subframe of the present disclosure as observed from a rear upper side.

In addition, on the lower side of the hole cylinder 19, a side lower member 27 is provided to connect the side front member 23 and the side rear member 25 while surrounding the hole cylinder 19. As illustrated in FIG. 8, the side upper member 21, the side front member 23, and the side lower member 27 form a structure in which multiple closed cross-sections overlap each other on the front side of the hole cylinder 19.

Of course, the side lower member 27 may also extend rearward to form a multiple closed cross-section overlapping structure with the side rear member 25.

However, in the present embodiment, it may be considered that the structure in which the side lower member 27 extends rearward while forming a multiple closed cross-section overlapping structure with the side rear member 25 is omitted since a side lower reinforcement member 29, which will be described later, supports the area between the rear side of the hole cylinder 19 and the rear cross member 7.

Accordingly, in the present embodiment, a multiple closed cross-section overlapping structure and a multi-support structure through the side lower reinforcement member 29 are provided on the front and rear sides of the hole cylinder 19, thereby overcoming structural weakness caused by the presence of the hole cylinder 19 and ensuring sufficient rigidity for the rear subframe 1.

At each end, the rear cross member 7 is coupled to and continuously surrounds the upper surface of the side upper member 21, the surfaces of the side upper member 21 and the side rear member 25 located inside the vehicle body, and the lower surface of the side rear member 25.

Figure 10:
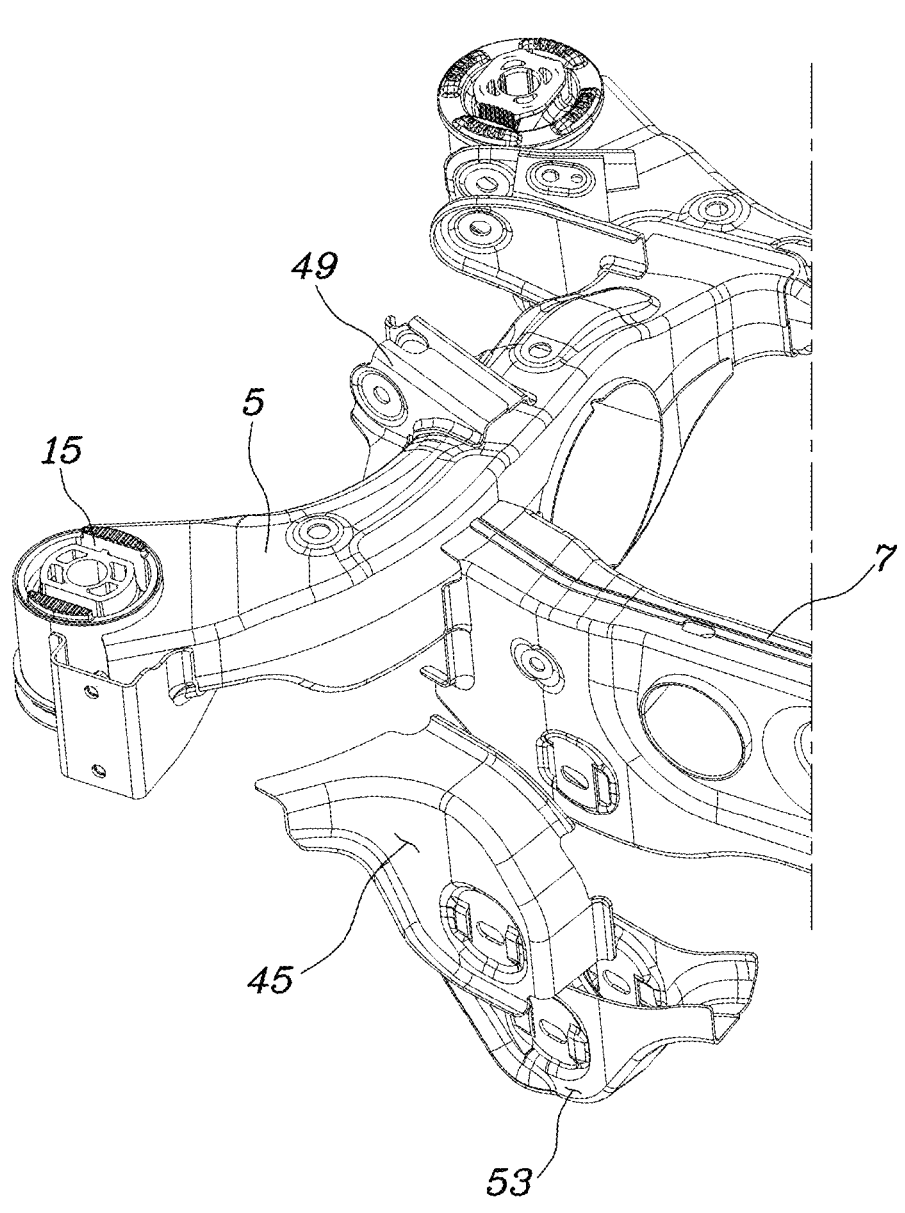
FIG. 10 is a view illustrating the rear subframe of FIG. 9 with some components exploded.
Figure 11:
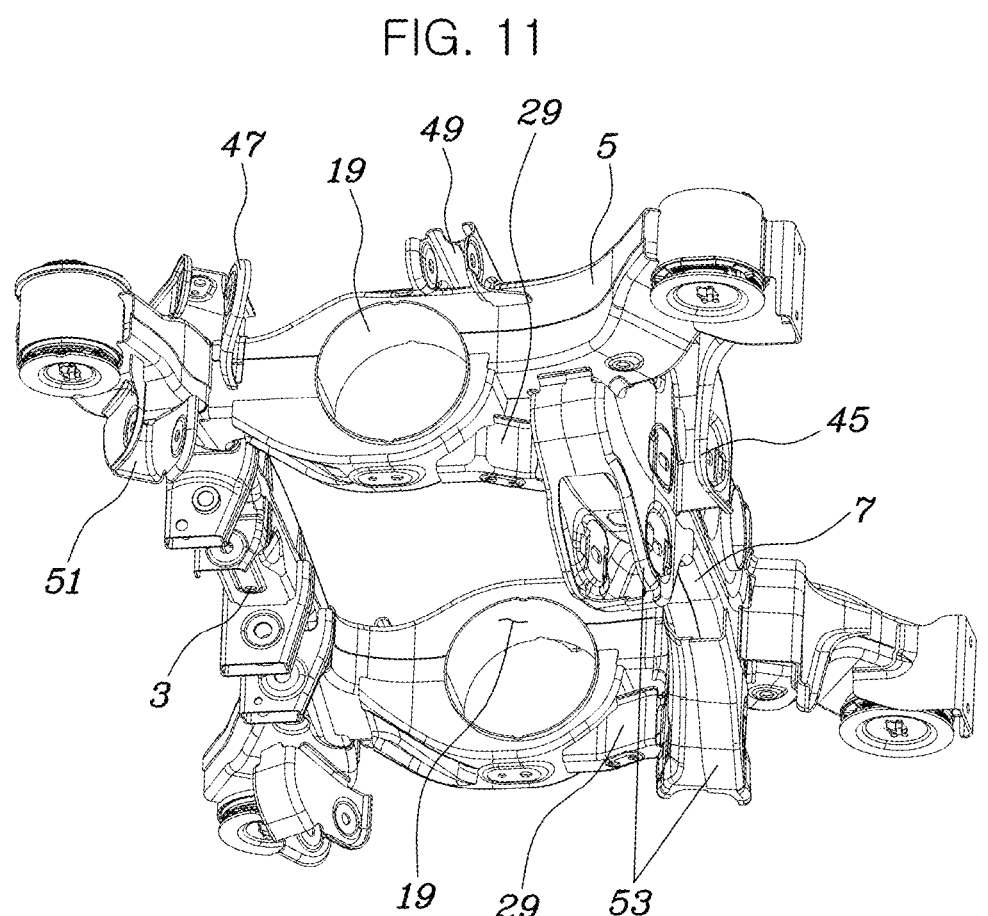
FIG. 11 is a view illustrating the rear subframe of the present disclosure as observed from a lower side.

FIG. 10 illustrates the rear cross member 7 and a side member 5 in a slightly separated state to describe the coupling structure between the rear cross member 7 and the side member 5. Each end portion of the rear cross member 7 is formed in a U-shape so as to continuously surround the upper surface of the side upper member 21, the surfaces of the side upper member 21 and the side rear member 25 located inside the vehicle body, and the lower surface of the side rear member 25, and is coupled to the side member 5 by welding or the like.

Accordingly, compared to a simple butt coupling between the rear cross member 7 and the side members 5, a more rigid coupling structure is formed without the need for additional reinforcement components.

A lower arm bracket 53 configured to rotatably support a lower arm 31, which extends in the lateral direction of the vehicle body, is integrally connected to the lower side of the rear cross member 7.

For reference, FIG. 10 illustrates the lower arm bracket 53 as being spaced apart downward from the rear cross member 7 for ease of understanding.

Figure 12:
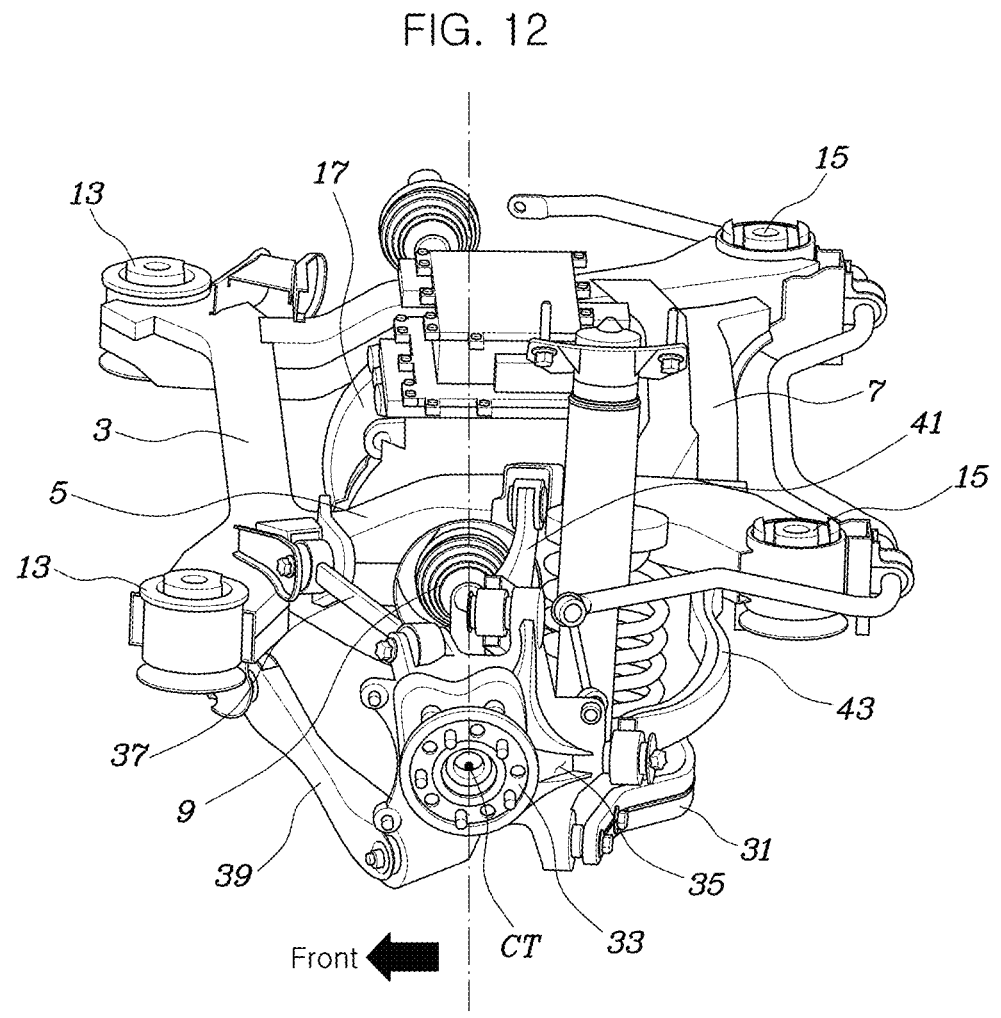
FIG. 12 is a view exemplifying a state in which a rear wheel motor and a suspension system are mounted on the rear subframe of the present disclosure.
Figure 13:
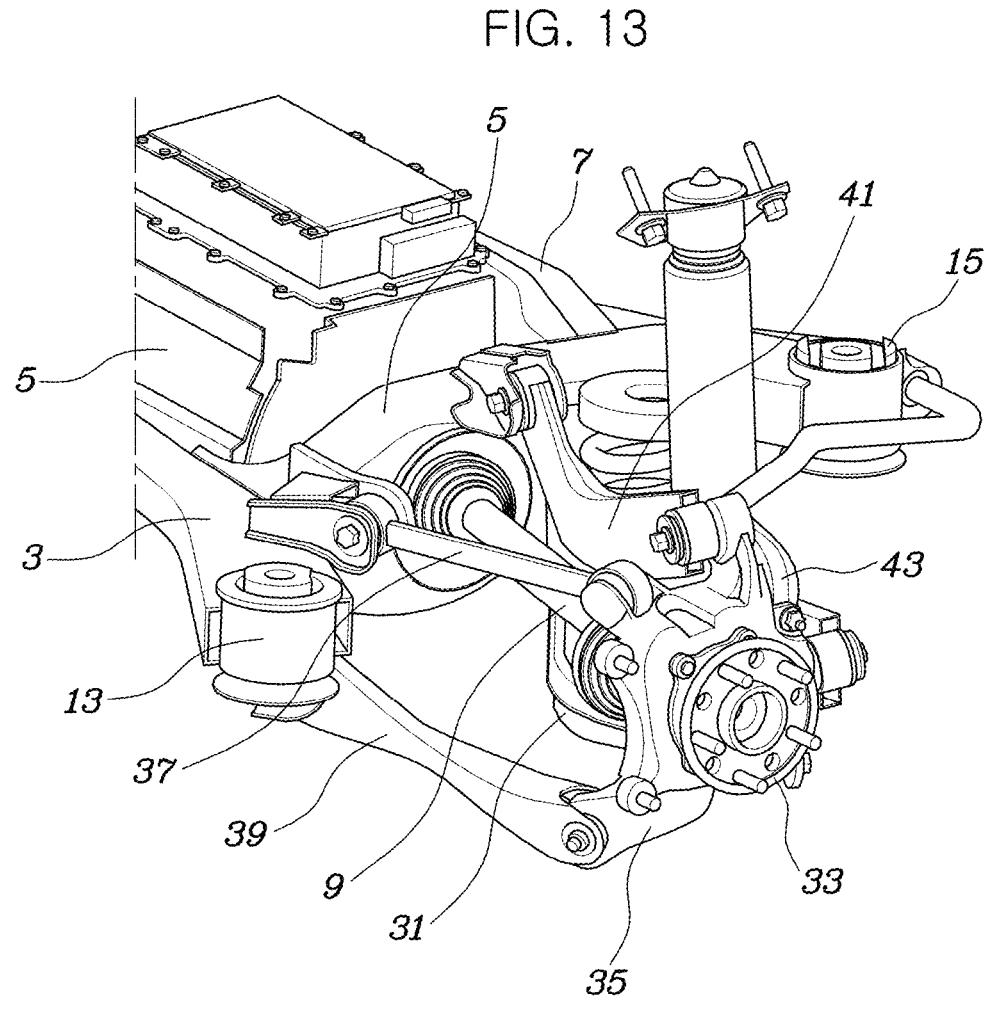
FIG. 13 is a view illustrating the configuration of FIG. 12 as observed from a front side.

FIGS. 12 and 13 illustrate an example in which a rear wheel motor 17 is mounted on the rear subframe 1 as described above. A wheel hub 33, to which a wheel is mounted, is rotatably supported by a knuckle 35. With respect to the wheel center CT, which is the center of the wheel hub 33, two suspension arms support the knuckle 35 at the front side on the rear subframe 1 while three suspension arms support the knuckle 35 at the rear side on the rear subframe 1.

The two suspension arms positioned on the front side of the wheel center CT are a front upper arm 37 and a front auxiliary arm 39, while the three suspension arms positioned on the rear side of the wheel center CT are the lower arm 31, a rear upper arm 41, and a rear auxiliary arm 43 positioned therebetween.

Meanwhile, the side lower reinforcement member 29 is provided between the lower arm bracket 53 and the side lower member 27 to connect and support them in the front-rear direction of the vehicle body, and ultimately serves to more rigidly support the area between the hole cylinder 19 and the rear cross member 7, as described above.

A rear auxiliary arm bracket 45 is provided behind of the rear cross member 7 to connect and support the side member 5 and the rear cross member 7 and to rotatably support a rear auxiliary arm 43, which extends in the lateral direction of the vehicle body, at a position above and behind the lower arm 31.

That is, the rear auxiliary arm bracket 45 not only serves as a structural component for reinforcing the connection between the rear cross member 7 and the side member 5 but also serves as a structural component for rotatably supporting the rear auxiliary arm 43, as described above.

Meanwhile, a front upper bracket 47, which rotatably supports the front upper arm 37, is provided above the connection between the front cross member 3 and each of the side members 5 while being supported by both the front cross member 3 and the side member 5.

Accordingly, the front upper bracket 47 serves to support the rotational axis of the front upper arm 37 and to reinforce the coupling rigidity between the front cross member 3 and the side member 5.

For reference, a rear upper bracket 49, which supports the rotational axis of the rear upper arm 41, is provided above the middle portion of the side member 5, and a front auxiliary arm bracket 51, which supports the rotational axis of the front auxiliary arm 39, is provided below the front cross member 3.

Figure 14:
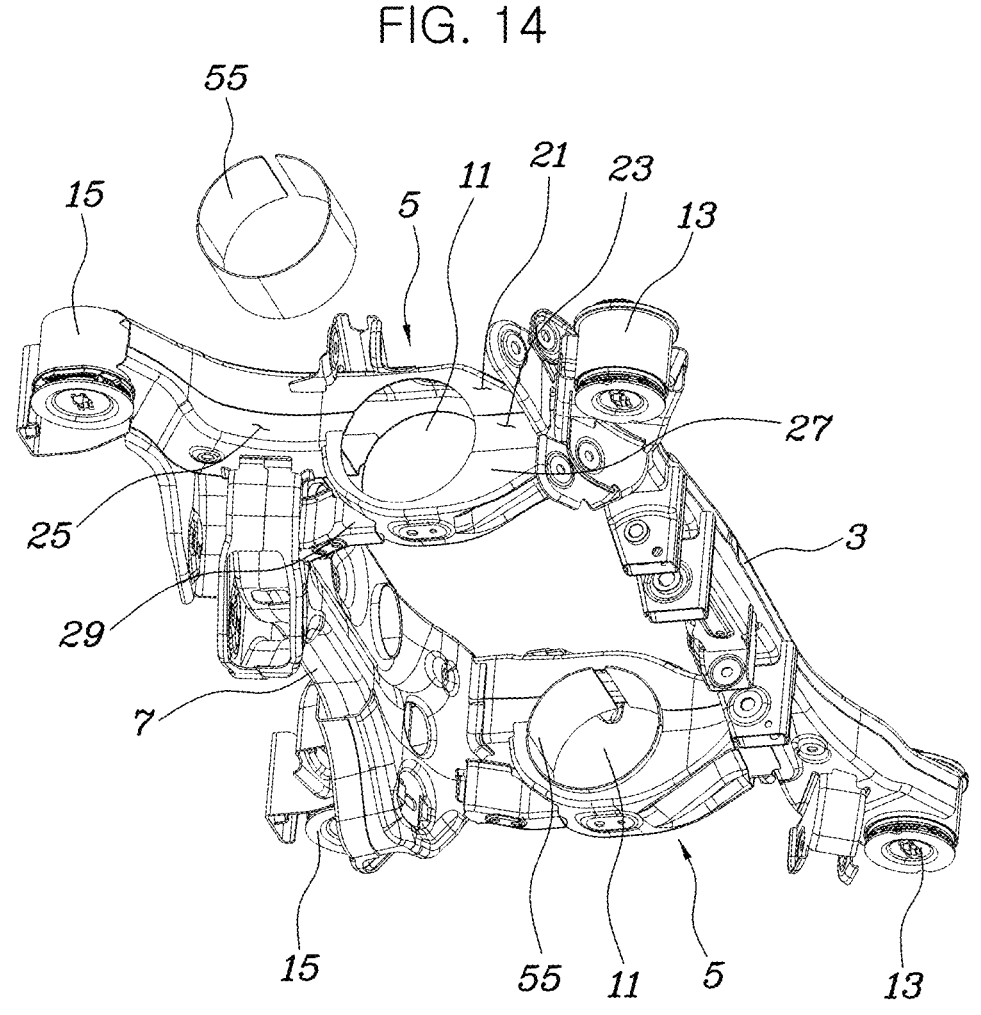
FIG. 14 is a view illustrating an embodiment in which a through-hole of each of side members is surround by an arc-shaped member having a cross-sectional shape in which a portion of a circle is cut out.
Figure 15:
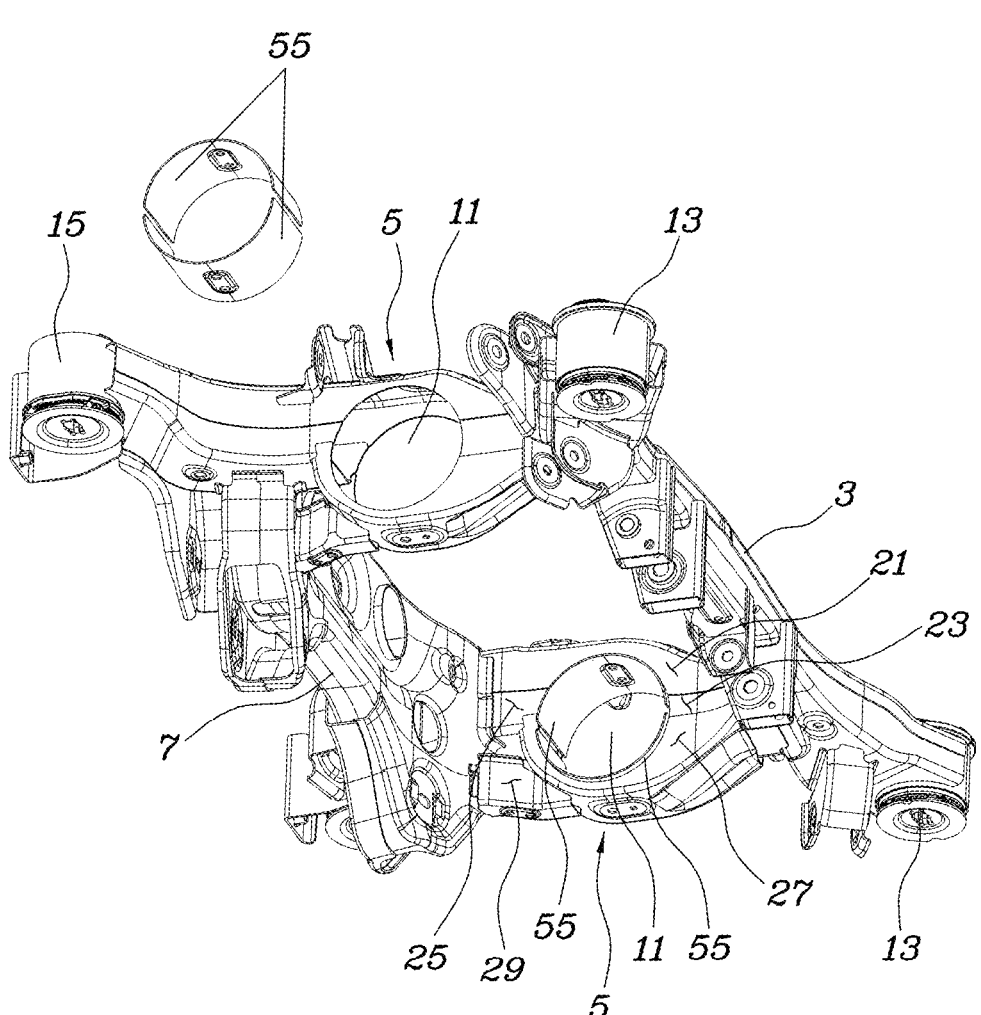
FIGS. 15 and 16 are views illustrating an embodiment in which a through-hole of each of side members is surrounded by at least one arc-shaped member arranged along a circumferential direction of the through-hole.
Figure 16:
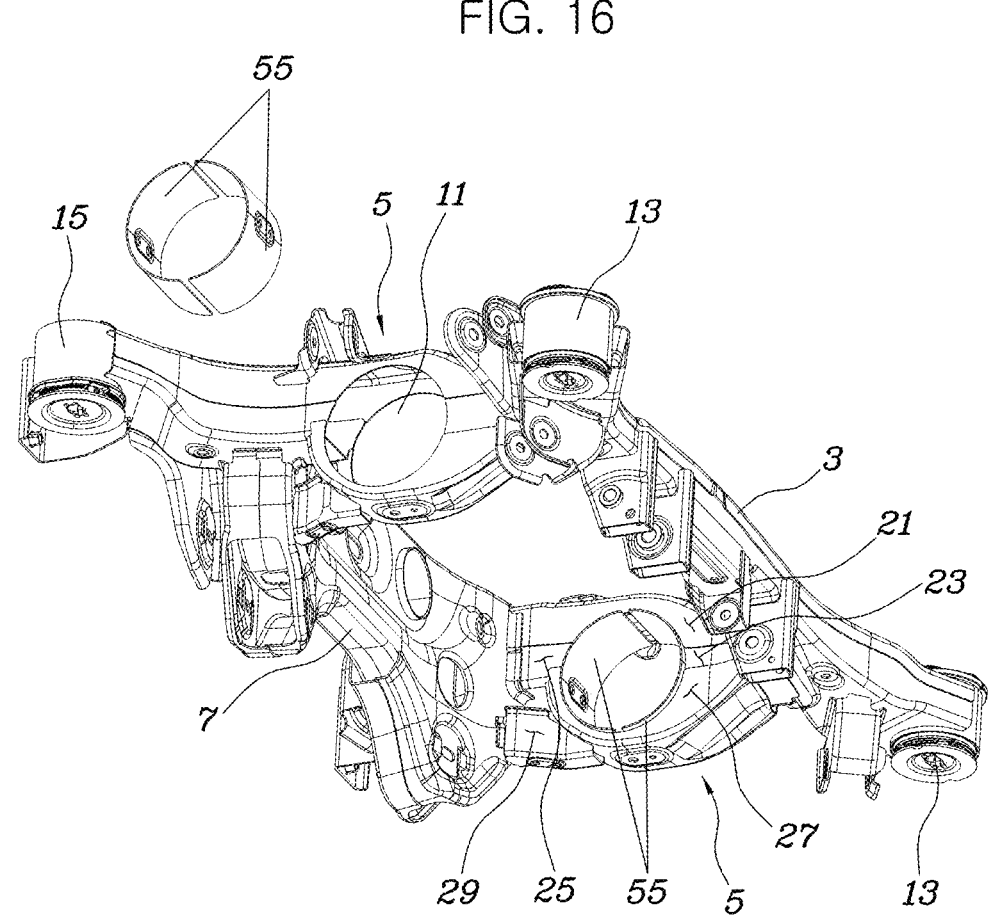

Meanwhile, FIG. 14 is a view illustrating an embodiment in which the through-hole 11 of each of the side members 5 is surrounded by an arc-shaped member 55 having a cross-sectional shape in which a portion of a circle is cut out. FIGS. 15 and 16 are views illustrating an embodiment in which the through-hole 11 of each of the side members 5 is surrounded by at least one arc-shaped member 55 arranged along the circumferential direction of the through-holes 11, in which each of the hole cylinders 19 is replaced with at least one arc-shaped member 55.

By configuring one or more arc-shaped members 55 to surround the through-hole 11 instead of the hole cylinder 19, which forms a complete circular cross-section, the manufacturing cost of the rear subframe 1 may be reduced, and the assembly workability may be improved depending on the manufacturing conditions.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A subframe comprising:
a front cross member extending in a lateral direction of a vehicle body;
two side members symmetrically connected to both rear sides of the front cross member and extending in a longitudinal direction of the vehicle body; and
a rear cross member spaced rearward from the front cross member, extending in the lateral direction of the vehicle body, and connecting the two side members,
wherein each of the two side members comprises a through-hole through which a drive shaft is disposable,
wherein each side member comprises:
a hole cylinder arranged in the through-hole;
a side upper member surrounding an upper side of the hole cylinder and continuously connecting to the front cross member;
a side front member connecting a front side of the hole cylinder and the front cross member and coupled to a lower side of the side upper member;
a side rear member connecting a rear side of the hole cylinder and coupled to the lower side of the side upper member; and
a side lower member surrounding a lower side of the hole cylinder and connecting the side front member and the side rear member.

2. The subframe of claim 1,
wherein the front cross member comprises a front mounting bush at each end portion, and
wherein each of the two side members comprises a rear mounting bush at a rear end portion.

3. The subframe of claim 2, wherein each end portion of the front cross member and each rear end portion of the side members extend in a diagonal direction of a rectangle formed by the front cross member, the two side members, and the rear cross member.

4. The subframe of claim 3, wherein the two side members are coupled to a rear side, an upper surface, a rear surface, and a lower surface of the front cross member.

5. The subframe of claim 1, wherein the side upper member, the side front member, and the side lower member form a structure with multiple closed cross-sections that overlap each other on the front side of the hole cylinder.

6. The subframe of claim 1, wherein each end of the rear cross member continuously surrounds an upper surface of a respective side upper member, inward facing surfaces of a respective side upper member and a respective side rear member, and a lower surface of a respective side rear member.

7. The subframe of claim 1, further comprising
a lower arm bracket configured to support a lower arm, which extends in the lateral direction of the vehicle body, wherein the lower arm bracket is integrally connected to a lower side of the rear cross member.

8. The subframe of claim 7, further comprising
a side lower reinforcement member that connects and supports the lower arm bracket and the side lower member in a front-rear direction of the vehicle body.

9. The subframe of claim 7, further comprising
a rear auxiliary arm bracket located behind the rear cross member and connecting and supporting one of the side members and the rear cross member, wherein the rear auxiliary arm bracket is configured to rotatably support a rear auxiliary arm, which extends in the lateral direction of the vehicle body, at a position above and behind the lower arm.

10. The subframe of claim 1, further comprising
a front upper bracket located above a connection between the front cross member and each side member, and being supported by both the front cross member and one of the side members, wherein the front upper bracket is configured to rotatably support a front upper arm.

11. The subframe of claim 1, wherein an arc-shaped member having a cut out is arranged in the through-hole of each side member.

12. A subframe comprising:
a front cross member extending in a lateral direction of a vehicle body;
two side members symmetrically connected to both rear sides of the front cross member and extending in a longitudinal direction of the vehicle body; and
a rear cross member spaced rearward from the front cross member, extending in the lateral direction of the vehicle body, and connecting the two side members,
wherein each of the two side members comprises a through-hole through which a drive shaft is disposable, wherein a plurality of arc-shaped members is arranged in the through-hole of each side member.

13. The subframe of claim 1, wherein the subframe is a rear subframe.

14. The subframe of claim 12, wherein the plurality of arc-shaped members is arranged along a circumferential direction of the through-hole.

15. The subframe of claim 12, further comprising a rear upper bracket provided above a middle portion of each side member and configured to support a rotational axis of a rear upper arm.

16. A subframe comprising:
a front cross member extending in a lateral direction of a vehicle body, wherein the front cross member comprises a front mounting bush at each end portion;
two side members symmetrically connected to both rear sides of the front cross member and extending in a longitudinal direction of the vehicle body, wherein each of the two side members comprises a rear mounting bush at a rear end portion; and
a rear cross member spaced rearward from the front cross member, extending in the lateral direction of the vehicle body, and connecting the two side members,
wherein each of the two side members comprises a through-hole through which a drive shaft is disposable, wherein each side member comprises:
at least one arc-shaped member arranged in the through-hole,
a side upper member surrounding an upper side of the through-hole with the at least one arc-shaped member and continuously connecting the front cross member and the rear mounting bush;
a side front member connecting a front side of the through-hole with the at least one arc-shaped member and the front cross member and coupled to a lower side of the side upper member;
a side rear member connecting a rear side of the through-hole with the at least one arc-shaped member and the rear mounting bush and coupled to the lower side of the side upper member; and
a side lower member surrounding a lower side of the through-hole with the at least one arc-shaped member and connecting the side front member and the side rear member.

17. The subframe of claim 16, wherein the side upper member, the side front member, and the side lower member form a structure in which multiple closed cross-sections overlap each other on a front side of the through-hole surrounded by the arc-shaped member.

18. The subframe of claim 16, wherein each end of the rear cross member is coupled while continuously surrounding an upper surface of the side upper member, and surfaces of the side upper member and the side rear member located inside the vehicle body, and a lower surface of the side rear member.

19. The subframe of claim 16, wherein a lower arm bracket configured to rotatably support a lower arm, which extends in the lateral direction of the vehicle body, is integrally connected to the lower side of the rear cross member.

20. The subframe of claim 16, further comprising
a side lower reinforcement member that connects and supports the lower arm bracket and the side lower member in a front-rear direction of the vehicle body.

* * * * *